United States Patent Office 3,468,938
Patented Sept. 23, 1969

3,468,938
METHOD OF PREPARING SULFONATED HYDROXYBENZOPHENONE
Anthony J. Cofrancesco and Richard Ferrigan, Albany, N.Y., assignors to GAF Corporation, New York, N.Y., a corporation of Delaware
No Drawing. Filed Oct. 21, 1966, Ser. No. 588,293
Int. Cl. C07b *13/02;* C07c *143/38*
U.S. Cl. 260—511                                   7 Claims

ABSTRACT OF THE DISCLOSURE

A process for producing sulfonated benzophenones which comprises sulfonating 2-hydroxy benzophenone and derivatives thereof with chlorosulfonic acid in the presence of a chlorinated lower alkane solvent having a low miscibility with water, removing the hydrochloric acid produced during the sulfonation, adding water to provide a 15–35% by weight solution of the sulfonated benzophenone, separating the solvent layer and spray drying.

---

This invention relates to sulfonated benzophenones, and particularly to a process of preparing pulverulent sulfonated hydroxybenzophenones.

It is well known that sulfonated 2-hydroxybenzophenones may be utilized in various solutions such as cosmetic solutions or lotions, hair sprays, or sun tan lotions and the like, where it is desirous to protect the solution from the deleterious effect of ultra-violet rays. When such compounds are utilized as ultra-violet absorbers in such solutions it is extremely important that the compounds be of the highest degree of purity, be completely water-soluble and be stable upon storage.

Heretofore, such sulfonated hydroxybenzophenones having the general formula:

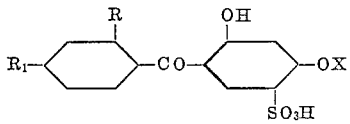

wherein R is a radical selected from the group consisting of hydrogen and hydroxy radicals, wherein $R_1$ is a radical selected from the group consisting of hydrogen, hydroxy and lower alkoxy radicals, wherein X is a radical selected from the group consisting of hydrogen and lower alkyl, for example, methyl, ethyl, propyl, etc., have been prepared by carrying out the sulfonation process in the presence of an organic solvent which is highly immiscible with water. The charge is then treated with water, the organic solvent separated, and the product then crystallized, filtered and transferred to pans to be dried in an oven. However, products obtained in this conventional manner have not been found to be completely satisfactory, since they are discolored and have a tannish shade. Moreover, the granular product is normally cakey and requires grinding, and the degree of purity is low. The reason for this is believed to be due to decomposition and/or partial desulfonation due to the combination of the presence of water, hydrochloric acid, the length of time and high temperatures of the drying oven.

We have now discovered a means of producing such sulfonated benzophenone products as a white fluffy powder having a high degree of purity. It is, therefore, an object of the present invention to provide a process for preparing sulfonated 2-hydroxybenzophenones. It is a further object of this invention to provide a process which produces these products as a white fluffy powder having a high degree of purity in a good yield. Other objects and advantages of this invention will become readily apparent in the following description and appended claims.

The attainment of the above objects is made possible by the instant invention which is directed to a process for producing a pulverulent sulfonated hydroxybenzophenone having the general formula:

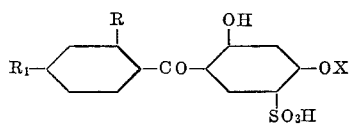

wherein R is a radical selected from the group consisting of hydrogen and hydroxy radicals, wherein $R_1$ is a radical selected from the group consisting of hydrogen, hydroxy and lower alkoxy radicals, wherein X is a radical selected from the group consisting of hydrogen and lower alkyl such as methyl, ethyl, propyl, etc., which comprises (a) sulfonating a hydroxy benzophenone having the general formula:

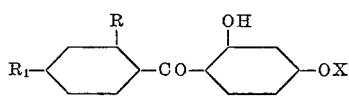

wherein R, $R_1$ and X are defined as above, with chlorosulfonic acid in the presence of an organic solvent; (b) removing the hydrochloric acid from the resulting solution; (c) treating the sulfonated product with water; (d) removing the solvent layer; and (e) drying the aqueous solution of hydroxybenzophenone sulfonic acid by spray drying.

Thus, it is evident from the above that the instant process requires a series of steps, several of which have critical embodiments which must be employed to deliver from the drier a hydroxybenzophenone sulfonic acid compound in the pulverulent form. It is particularly important that the organic solvent used be non-aromatic and one which has a low degree of miscibility with water. Examples of such solvents are carbon tetrachloride, tetrachloroethane, chloroform and the like, and preferably ethylene dichloride. It is equally important that the hydrochloric acid formed by the sulfonation process be removed and this is accomplished, for example, by bubbling air through the solution. After removal of the hydrochloric acid, water is then added to produce an aqueous solution from which the water immiscible solvent layer separates. Especially good results have been obtained by adding sufficient amounts of water to produce an aqueous solution ranging from about 15 to 35% by weight of water. The solvent layer may be removed by any conventional known method such as decantation. The spray drying of the aqueous solution of hydroxybenzophenone sulfonate may be accomplished with any commercial spray drier. However, the temperature of ingression must range from about 185 to 275° F. and the temperature of egression must range from about 100 to 212° F., while the total time for a pass should range from about 0.5 to 2 seconds. Operations outside of these ranges fail to deliver the hydroxybenzophenone sulfonic acid compound from the drier as a white fluffy powder.

The unsulfonated hydroxybenzophenones utilized as the starting materials in the instant process are known and may be prepared by the method described in U.S. Patent 2,861,104, issued Nov. 18, 1958.

The following examples are illustrative of the present invention and are not to be regarded as limitative. It is to be understood that all parts, percentages and proportions referred to herein and in the appended claims are by weight unless otherwise indicated.

Example I 40 grams of 2-hydroxy-4-methoxybenzophenone were dissolved in 200 cc. of ethylene dichloride. To this solution, 21.5 grams of chlorosulfonic acid were added. This charge was the refluxed for one hour and then cooled to about 65° C. Air was blown thru the charge to remove the hydrochloric acid. The charge was then treated with 80 cc. of water, cooled to 45° C., allowed to stand for 2 hours and the ethylene dichloride layer was separated from the aqueous solution.

The water content was adjusted to about a 28% solution which was then sprayed into the spray drier at an ingress temperature of about 225° F., the egression temperature being about 135° F., and the time for a pass being from about 0.5 to 2 seconds. The product, 2-hydroxy-4-methoxybenzophenone-5-sulfonic acid, was collected from the drier as a fluffy white powder and had a melting point of 106 to 111° C. and a K value of 40 (the K value being defined as the absorption of 1 gram of material per liter of solution measured in a 1 centimeter cell), and was of high purity and exhibited good storage stability.

Example II

The procedure in Example I was repeated except that 2-hydroxy-4-methoxybenzophenone was replaced with 2,4-dihydroxybenzophenone and the whitte fluffy powder obtained was 2,4-dihydroxy-benzophenone-5-sulfonic acid which was of high purity and exhibited good storage stability.

Example III

The procedure in Example I was repeated except that 2-hydroxy-4-methoxybenzophenone was replaced with 2-hydroxy-4-ethoxybenzophenone and the white fluffy powder obtained was 2-hydroxy-4-ethoxybenzophenone-5-sulfonic acid which was of high purity and exhibits good storage stability.

Example IV

The procedure in Example I was repeated except that 2-hydroxy-4-methoxybenzophenone was replaced with 2-hydroxy-4-propoxybenzophenone and the white fluffy powder obtained was 2-hydroxy-4-propoxybenzophenone-5-sulfonic acid which was of high purity and exhibits good storage stability.

Example V

The procedure in Example I was repeated except that 2-hydroxy-4-methoxybenzophenone was replaced with 2,2'-dihydroxy-4,4'-dimethoxybenzophenone and the white fluffy powder obtained was 2,2'-dihydroxy-4,4'-dimethoxybenzophenone-5-sulfonic acid which was of high purity and exhibits good storage stability.

From the foregoing examples it becomes clearly obvious that other 2-hydroxybenzophenones may be utilized as the starting materials in the above process. Other 2-hydroxybenzophenones that may be mentioned are:

2,2'-dihydroxy-4,4'-diethoxybenzophenone
2,2',4,4'-tetrahydroxybenzophenone
2,2'-dihydroxy-4-methoxybenzophenone
2,2'-dihydroxy-4-ethoxybenzophenone
2,2'-dihydroxy-4-hydroxybenzophenone
2,2',4-trihydroxy-4'-methoxybenzophenone
2,2',4'-trihydroxy-4-methoxybenzophenone
2,4-dihydroxy-4'-methoxybenzophenone
2-hydroxy-4,4'dimethoxybenzophenone
2,4,4'-trihydroxybenzophenone
2,4'-dihydroxy-4-methoxybenzophenone.

Various modifications and variations of this invention will be obvious to a worker skilled in the art and it is understood that such modifications and variations are to be included within the purview of this application and the spirit and scope of the appended claims.

We claim:

1. A process for producing a pulverulent sulfonated hydroxybenzophenone having the general formula:

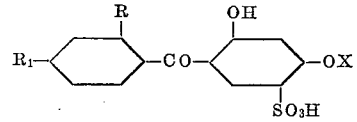

wherein R represents a radical selected from the group consisting of hydrogen and hydroxy radicals, wherein $R_1$ represents a radical selected from the group consisting of hydrogen, hydroxy and lower alkoxy radicals, and wherein X represents a radical selected from the group consisting of hydrogen and lower alkyl radicals which comprises (a) sulfonating a hydroxybenzophenone having the general formula:

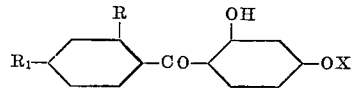

wherein R, $R_1$ and X represent radicals as defined above, with chlorosulfonic acid in the presence of a chlorinated lower alkane solvent which has a low miscibility with water; (b) removing the hydrochloric acid from the resulting solution; (c) adding a sufficient amount of water to obtain about a 15 to 35% aqueous solution; (d) removing the organic solvent layer; and (e) subjecting the aqueous solution of the sulfonated benzophenone to continuous spray drying in which the temperature of ingression ranges from about 185 to 275° F., the temperature of egression ranges from about 100 to 212° F. and the total time for a pass ranges from 0.5 to 2 seconds to obtain the sulfonated hydroxybenzophenone compound in the form of a white fluffy powder.

2. The process as defined in claim 1, wherein X represents hydrogen and R and $R_1$ represent hydrogen.

3. A process as defined in claim 1, wherein X represents a methyl radical and wherein R and $R_1$ represent hydrogen.

4. A process as defined in claim 1, wherein X represents an ethyl radical and wherein R and $R_1$ represent hydrogen.

5. A process as defined in claim 1, wherein X represents a propyl radical and wherein R and $R_1$ represent hydrogen.

6. A process as defined in claim 1, wherein X represents a methyl radical; wherein R represents a hydroxy radical and wherein $R_1$ represents a methoxy radical.

7. A process as defined in claim 1, wherein the chlorinated lower alkane solvent is ethylene dichloride.

References Cited

UNITED STATES PATENTS 2,864,857  12/1958  Whitney _____ 260—505

OTHER REFERENCES

Gilbert: Sulfonation and Related Reactions, pages 37, 65, 91, 375 and 376 (1965), Interscience Publishers, New York, N.Y. Call No. QD305S3G5C.2.

Perry: Chemical Engineers' Handbook, 4th edition, McGraw-Hill Book Co., Inc., New York, N.Y., pages 20–57 to 20–60.

DANIEL D. HORWITZ, Primary Examiner